United States Patent
Twohig et al.

(10) Patent No.: US 12,430,048 B2
(45) Date of Patent: Sep. 30, 2025

(54) OPTIMIZED THROUGHPUT OF VOLUME CREATIONS

(71) Applicant: Dell Products L.P., Round Rock, TX (US)

(72) Inventors: Aaron T. Twohig, Rathpeacon (IE); Aidan Hally, Fermoy (IE); Paul McSweeney, Cork (IE)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/295,899

(22) Filed: Apr. 5, 2023

(65) Prior Publication Data

US 2024/0338134 A1    Oct. 10, 2024

(51) Int. Cl.
*G06F 3/06* (2006.01)
*G06F 9/54* (2006.01)

(52) U.S. Cl.
CPC ............ *G06F 3/0631* (2013.01); *G06F 3/061* (2013.01); *G06F 3/0656* (2013.01); *G06F 3/067* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 9,274,937 B2 * | 3/2016 | Batwara | ............... | G06F 16/1734 |
| 9,678,683 B1 * | 6/2017 | Chen | ................... | G06F 9/45558 |
| 10,404,613 B1 * | 9/2019 | Brooker | .................. | H04L 47/70 |
| 11,169,727 B1 * | 11/2021 | Doucette | ................. | G06F 3/067 |
| 2006/0047902 A1 * | 3/2006 | Passerini | ............... | G06F 3/0656 |
| | | | | 711/114 |
| 2012/0179799 A1 * | 7/2012 | Kano | ...................... | G06F 9/505 |
| | | | | 709/223 |
| 2016/0154834 A1 * | 6/2016 | Friedman | ................ | G06F 3/067 |
| | | | | 707/657 |
| 2017/0060422 A1 * | 3/2017 | Sharifie | ................. | G06F 3/0659 |
| 2019/0220205 A1 * | 7/2019 | Alluboyina | ........... | G06F 9/5072 |
| 2020/0081794 A1 * | 3/2020 | Wu | ......................... | G06F 3/061 |
| 2022/0156112 A1 * | 5/2022 | Singh | ................. | G06F 11/2028 |

* cited by examiner

*Primary Examiner* — Yaima Rigol
(74) *Attorney, Agent, or Firm* — DALY, CROWLEY, MOFFORD & DURKEE, LLP

(57) ABSTRACT

An example methodology includes, responsive to receiving a first volume creation request to create one or more volumes on a storage device, creating a first operation object for the first volume creation request and determining that a waiting buffer is appropriate for the first operation object. The method also includes placing the first operation object in the waiting buffer and, responsive to a determination that the first operation object is a first operation object placed in the waiting buffer, notifying a waiting buffer thread of the first operation object in the waiting buffer. The method further includes, upon expiration of a predetermined buffer waiting period defined for the waiting buffer, by the waiting buffer thread, extracting the first volume creation request and a second volume creation request from the waiting buffer, combining the first and second operation objects into single workload, and executing the single workload.

18 Claims, 8 Drawing Sheets

Operation Object 300

- numVolumes
- volumeSize
- volumeSizeUnit
- volumeConfigType
- storageGroup
- Output
- Exception
- Finished Flag
- Too Busy Flag
- etc

FIG. 3

OPTIMIZED THROUGHPUT OF VOLUME CREATIONS

BACKGROUND

Storage arrays and other types of storage systems are often shared by multiple host devices over a network. For example, applications running on the host devices may utilize storage systems to store and retrieve data. These storage systems may be configured to organize the storage resources (e.g., physical storage devices) into logical units (LUNs) or other types of storage volumes, each with its own addressable space.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, responsive to receiving, by a computing device, a first volume creation request to create one or more volumes on a storage device, by the computing device, creating a first operation object for the first volume creation request and determining that a waiting buffer is appropriate for the first operation object. The method also includes, by the computing device, placing the first operation object in the waiting buffer and, responsive to a determination that the first operation object is a first operation object placed in the waiting buffer, notifying a waiting buffer thread of the first operation object in the waiting buffer.

In some embodiments, the first operation object models a volume creation operation that would be performed to service the first volume creation request.

In some embodiments, the appropriate waiting buffer is determined based on a storage group associated with the first volume creation request.

In some embodiments, the appropriate waiting buffer is determined based on an application programming interface (API) call used to make the first volume creation request.

In some embodiments, the method also includes, responsive to receiving, by the computing device, a second volume creation request to create one or more volumes on the storage device, by the computing device, creating a second operation object for the second volume creation request and determining that the waiting buffer is appropriate for the second operation object. The method further includes, by the computing device, placing the second operation object in the waiting buffer and, responsive to a determination that the second operation object is not a first operation object placed in the waiting buffer, not notifying, by the computing device, the waiting buffer thread of the second operation object in the waiting buffer.

In some embodiments, the method also includes, upon expiration of a predetermined buffer waiting period defined for the waiting buffer, by the waiting buffer thread, extracting the first volume creation request and the second volume creation request from the waiting buffer, combining the first operation object and the second operation object into single workload, and executing the single workload.

In one aspect, the combining the first operation object and the second operation object includes linking the first operation object and the second operation object.

In some embodiments, the computing device is included within a storage system.

In some embodiments, the first volume creation request is from an orchestration tool associated with a storage system.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 shows an example operation object, in accordance with an embodiment of the present disclosure.

DETAILED DESCRIPTION

Figure 1:
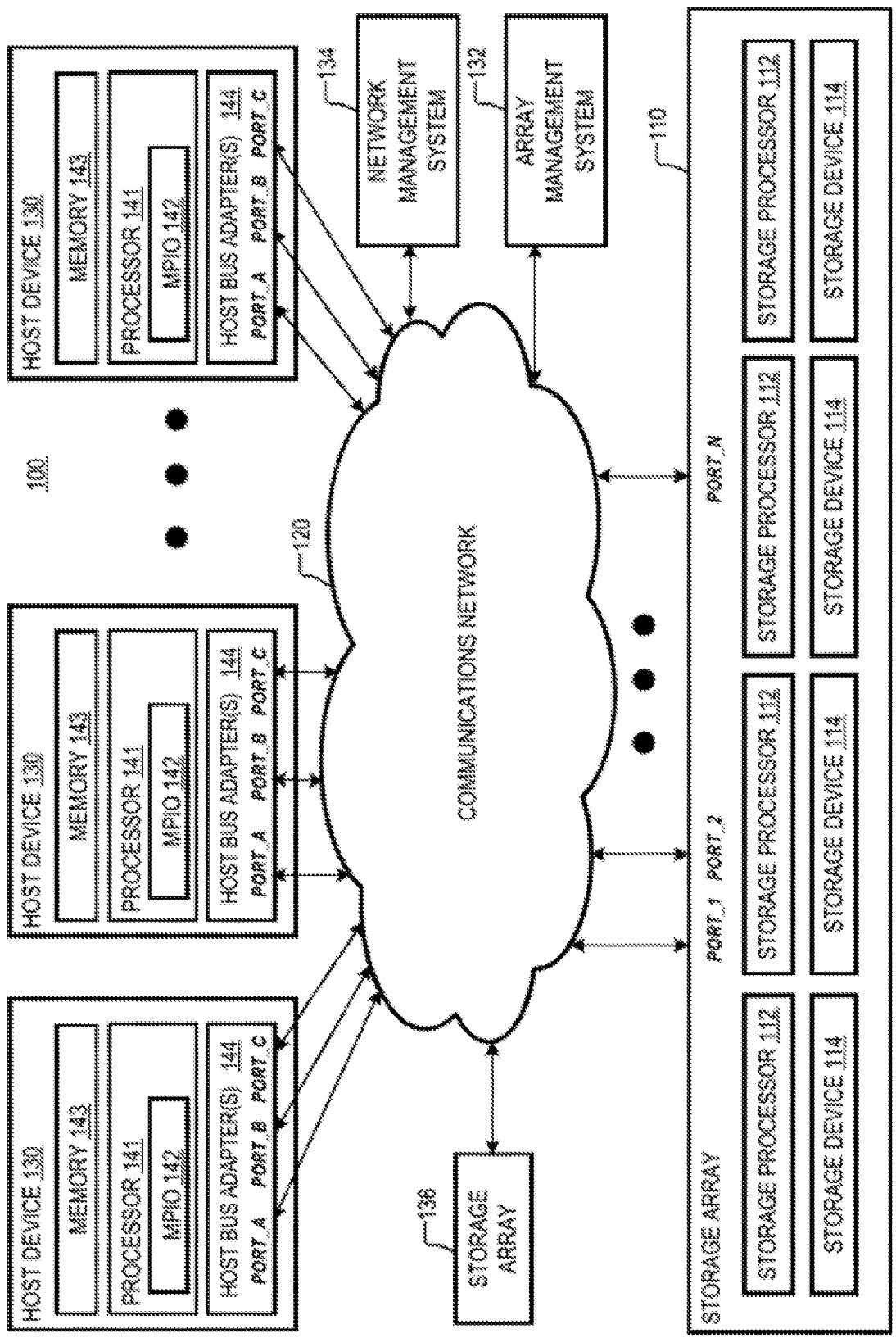
FIG. 1 is a block diagram of an illustrative storage system within which embodiments of the present disclosure may be utilized.

Within storage systems, a management system generally provisions the storage resources (e.g., storage arrays). For example, the management system can provision storage volumes (also referred to herein more simply as "volumes") in response to volume creation requests. Such requests may be from an orchestration tool, such as Kubernetes, for managing and scaling containerized applications. The orchestration tool can request the volumes it requires from the management system. It is not uncommon for the orchestration tool to issue a large number of volume creation requests in a short duration. Conventional management systems implement a default thread model where each incoming volume creation request is serviced immediately by a single thread. While immediately servicing each volume creation request using a respective thread scales effectively when creating a large number of volumes in one operation, this servicing model does not scale well under high load when each volume is requested separately and concurrently. That is, the servicing model implemented by conventional management systems may experience inefficiency and insufficient throughput when all volume creation requests are concurrently passed on for servicing.

Disclosed herein are concepts, structures, and techniques for optimized throughput of volume creation requests. This can be achieved by combining incoming volume creation requests to reduce the number of calls to the storage device (e.g., storage array) to request volumes. The reduction in the number of calls requesting volumes to the storage device provides improvement of the overall throughput, and in some cases significant improvement of the overall throughput of volume creations in the storage device. According to some embodiments, a management system within or associated with a storage system implements a new threading model which utilizes waiting buffers to achieve the reduction in the number of volume creation requests that is made to a storage device. In this new threading model, in response to receiving a volume creation request, the management system identifies an appropriate waiting buffer for the received volume creation request and places the received volume creation request in the identified waiting buffer for a predetermined buffer waiting period (e.g., buffer waiting period=1 second). During the buffer waiting period, other volume creation requests received by the management system, and which are similar to the volume creation request in the waiting buffer are also placed in the same waiting buffer. Volume creation requests received by the management system and which are dissimilar to the volume creation request in the waiting buffer can be placed in other waiting buffers. At the end of the waiting period, a thread of execution (also known as a "thread"), such as a thread that is waiting on the waiting buffer, can combine the volume creation requests that are in the waiting buffer into a single volume creation request (e.g., combine the volume creation requests into a single request for volumes). The thread can then execute the single volume creation request to the storage device and return the result of the volume creation. For example, the management system can return the result and/or error messages to the original threads that made the volume creation requests so that the original threads can inform the clients (e.g., host devices) of the volume creation success or failure. Numerous configurations and variations will be apparent in light of this disclosure.

As used herein, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage area network (SAN)).

As used herein, the term "storage array" (also known as a "disk array") may refer to a data storage system that is used for block-based, file-based, or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton MA). In certain embodiments, a data storage entity may be any one or more of a file system, object storage, a virtualized device, a logical unit, a logical unit number, a logical volume, a logical device, a physical device, and/or a storage medium.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 800 of FIG. 8. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 8:
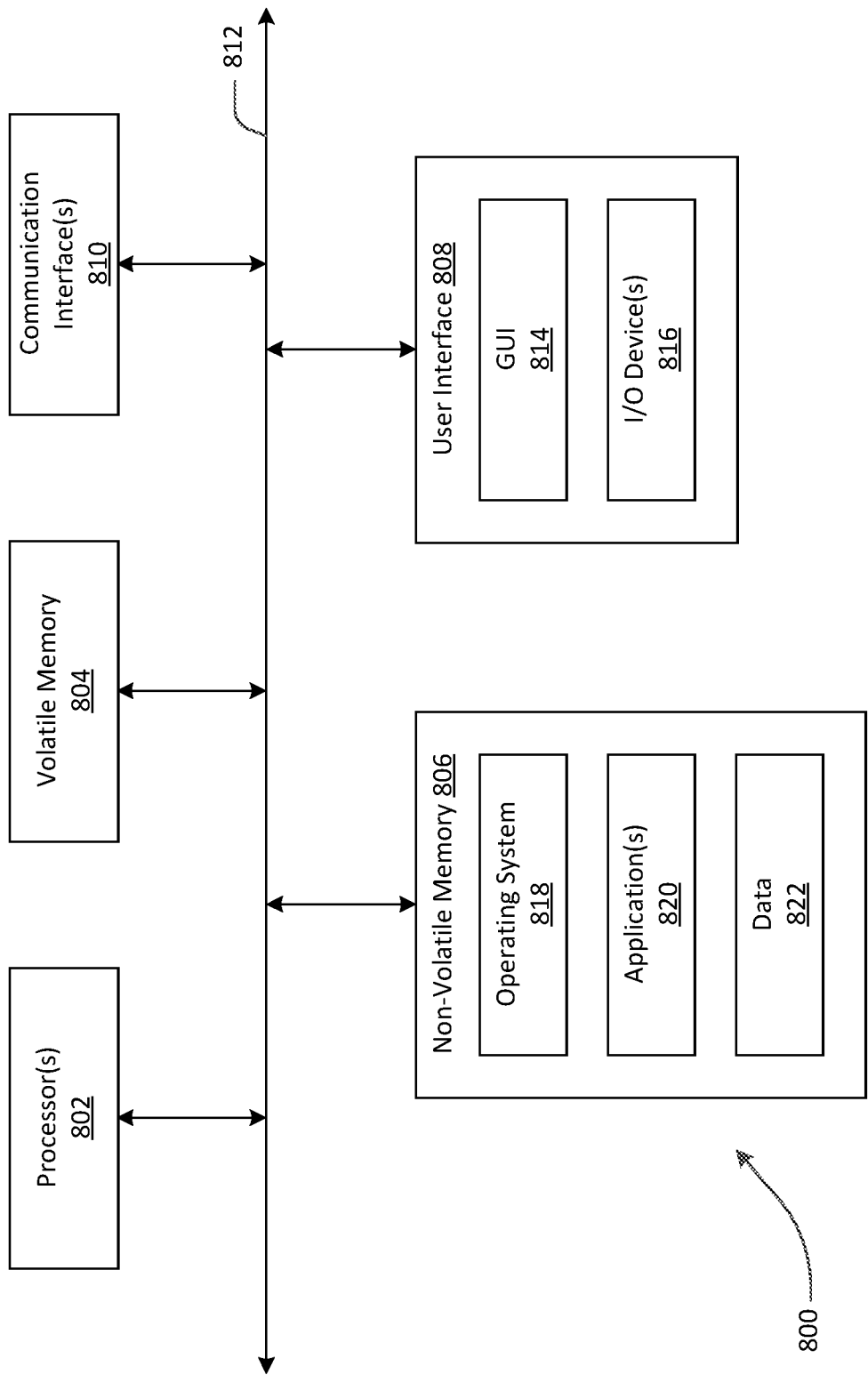
FIG. 8 is a block diagram illustrating selective components of an example computing device in which various aspects of the disclosure may be implemented, in accordance with an embodiment of the present disclosure.

Array management system 132 may include a computing device, such as computing device 800 of FIG. 8. Array management system 132 may be used by a system administrator to re-configure storage array 110, e.g., when degraded performance of storage array 110 is detected.

Network management system 134 may include a computing device, such as computing device 800 of FIG. 8. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
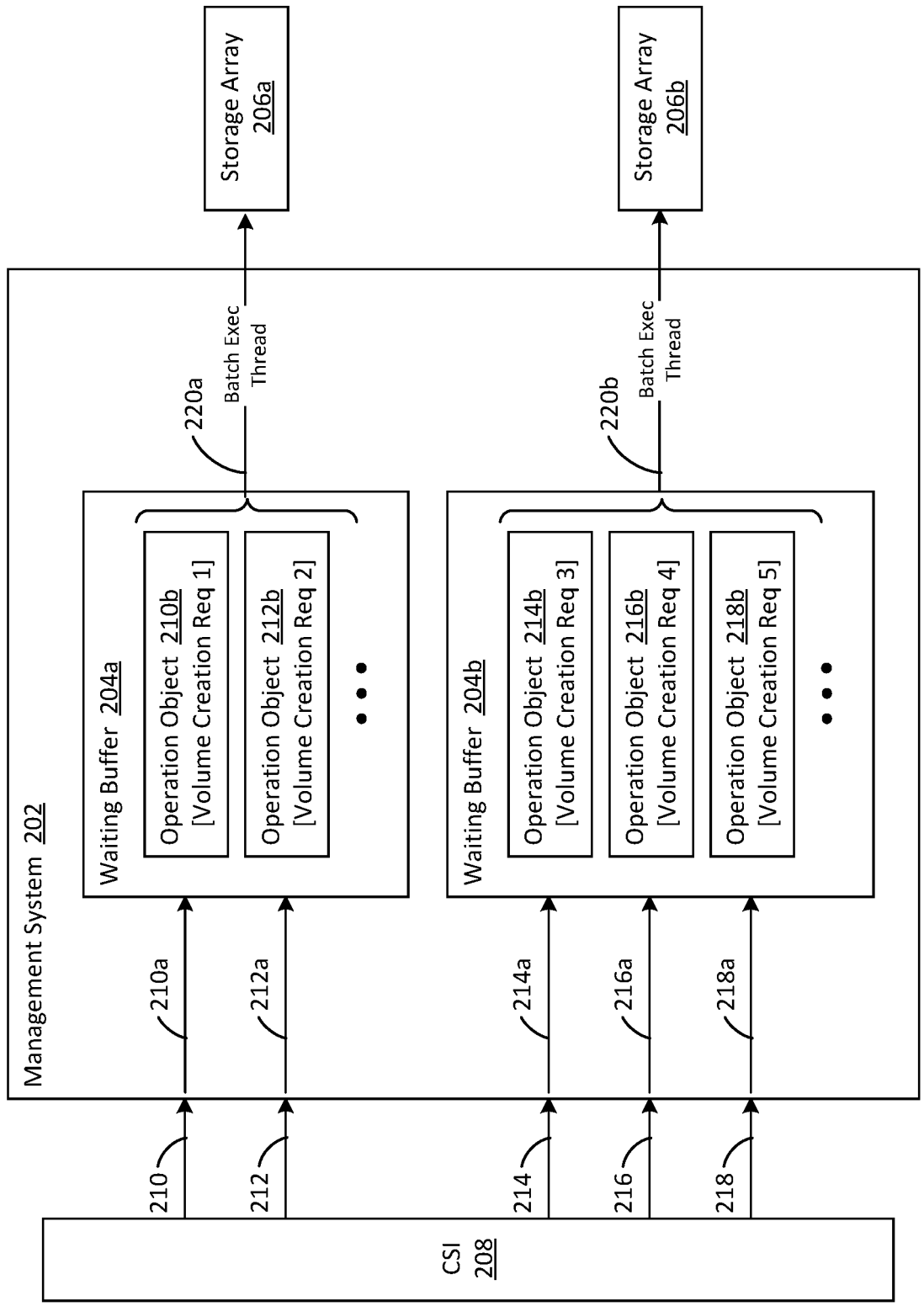
FIG. 2 is a simplified diagram showing an example system topology that can be used for optimizing throughput of volume creations, in accordance with an embodiment of the present disclosure.

Referring now to FIG. 2, shown is a simplified diagram showing an example system topology that can be used for optimizing throughput of volume creations, in accordance with an embodiment of the present disclosure. Such a topology can be understood as a process in which a management system 202 leverages one or more waiting buffers 204a, 204b (204 generally) to optimize throughput of volume creations within corresponding one or more storage arrays 206a, 206b (206 generally). In some embodiments, management system 202 may correspond to array management system 132 of FIG. 1. To promote clarity in the drawings, FIG. 2 shows two waiting buffers 204 and corresponding two storage arrays 206 for purposes of clarity. However, it will be appreciated that there may be more than two waiting buffers 204 and corresponding numbers of storage arrays 206. Also, although certain embodiments and/or examples are described herein in the context of storage arrays (e.g., storage arrays 206), it will be appreciated in light of this disclosure that such embodiments and/or examples are not restricted as such but are applicable to storage devices in the general sense.

As shown in FIG. 2, a container storage interface (CSI) 208 may send a volume creation request 210 to management system 202. In response, management system 202 can generate a thread 210a to accept and process volume creation request 210 from CSI 208. In some embodiments, thread 210a can create an operation object 210b that models a volume creation operation that would normally be performed directly to service volume creation request 210. Upon creating operation object 210, thread 210a can determine (or "identify") a waiting buffer for operation object 210b. The determined waiting buffer can be understood to be a waiting buffer in which thread 210a is to wait for processing by management system 202 (e.g., wait until being processed by management system 202). In the example of FIG. 2, thread 210a can identify waiting buffer 204a and place (or "add") operation object 210b to waiting buffer 204a.

In some embodiments, an appropriate waiting buffer for a volume creation request (e.g., an operation object) may be determined based on a storage group indicated in or associated with the volume creation request. A storage group refers to a named set of storage paths where data can be stored. Storage groups can be configured to represent different classes of storage that are available in the storage system (e.g., storage system 100 of FIG. 1). For example, suppose a volume creation request is to create a volume on storage group A. In this example, a waiting buffer for storage group A can be determined and the volume creation request (e.g., the operation object created for the volume creation request) can be placed to the determined waiting buffer.

In some embodiments, an appropriate waiting buffer for a volume creation request (e.g., an operation object) may be determined based on characteristics of an application programming interface (API) call used to make or issue the volume creation request to management system 202. For example, suppose management system 202 supports a Representational State Transfer (REST) API for communicating with and accessing management system 202. In this example, identical or substantially similar REST API calls to request the volumes (i.e., request creation of the volumes on the storage devices) can be placed in the same waiting buffer. One example is when operations that specify the same disk array and the storage group and the same volume type and the same configuration type are placed in the same buffer. These operations can later be combined into a single workload with a single operation object. Another example is when operations specify the same disk array, but different storage groups, volume types and/or configuration types.

Those operations can be placed in another buffer and later combined into a single workload containing a linked list of operation objects.

In some embodiments, a thread that places a first operation object in a waiting buffer may notify a thread, such as a waiting buffer thread, which is waiting on the waiting buffer of the operation object that is waiting to be processed in the waiting buffer. In response to such notification, the thread that is waiting on the waiting buffer, according to one embodiment, may wait for a predetermined buffer waiting period (e.g., buffer waiting period=1 second) to process the operation objects that are waiting to be processed in the waiting buffer. The value (e.g., a duration) of the buffer waiting period may be configured as part of a management system execution policy. Waiting for the predetermined buffer waiting period allows for other operation objects to be added to the waiting buffer. Upon expiration of the predetermined buffer waiting period, the thread that is waiting on the waiting buffer can retrieve or otherwise extract the operation objects from the waiting buffer and combine the operation objects into a single workload (e.g., combine the operation objects for passing with a single volume creation request). The thread that is waiting on the waiting buffer can then execute the single workload (i.e., execute the combined workload) and update each operation object with the result of the execution. Upon updating the operation objects with the result of the execution, the thread can notify the threads associated with the operation objects of the completion of the respective volume creation requests. In response, the threads associated with the operation objects can communicate the result of the volume creation requests to the respective clients (e.g., communicate the result of the volume creation requests to the respective clients that requested the volumes (e.g., a host device that requested the volume)).

In some embodiments, operation objects in a waiting buffer may be combined into a single workload composed of an operation object that is the combination of the operation objects. For example, suppose three operation objects for a total of seven volumes are in a waiting buffer. In this example, the three operation objects for the seven volumes can be combined into a single workload composed of one operation object for seven volumes. Further description of combining the operation objects in a waiting buffer to a single operation object is provided below at least with respect to FIG. 4.

In some embodiments, operation objects in a waiting buffer may be combined into a single workload composed of a linked list of one or more operation objects. For example, suppose three operation objects A. B, and C for a total of five volumes are in a waiting buffer. In this example, the three operation objects A, B, and C may be linked (e.g., a linked list composed of operation object A followed by operation object B followed by operation object C) and passed with a single request for five volumes. Further description of linking operation objects in a waiting buffer and passing the linked operation objects with a single volume creation request is provided below at least with respect to FIG. 5.

Referring again to the example of FIG. 2, as mentioned previously, management system 202 can generate thread 210*a* to process volume creation request 210 from CSI 208. Thread 210*a* can create operation object 210*b* and identify a waiting buffer for operation object 210*b*. In the example of FIG. 2, volume creation request 210 may be a request to create a volume(s) on storage array 206*a*. Thread 210*a* can identify waiting buffer 204*a* and place operation object 210*b* to waiting buffer 204*a* since waiting buffer 204*a* is a waiting buffer for requests for volumes on storage array 206*a*.

Thread 210*a* can then determine whether operation object 210*b* placed in waiting buffer 204*a* is a first operation object in waiting buffer 204*a*. That is, thread 210*a* can determine whether it is the first thread waiting in waiting buffer 204*a*. In the example of FIG. 2, thread 210*a* can notify a thread 220*a* that is waiting on waiting buffer 204*a* of operation object 210*b* waiting to be processed in waiting buffer 204*a* since operation object 210*b* is a first operation object in waiting buffer 204*a*. Thread 210*a* can then wait to receive the result of the volume creation request (e.g., result of volume creation request 210).

Continuing the example of FIG. 2, management system 202 may subsequently receive a volume creation request 212 from CSI 208. For example, volume creation request 212 may be a request to create a volume(s) on storage array 206*a*. Volume creation request 212 may be received within the duration of a predetermined buffer waiting period defined for waiting buffer 204*a* (i.e., received prior to expiration of the predetermined buffer waiting period defined for waiting buffer 204*a*). In response, management system 202 can generate a thread 212*a* to accept and process volume creation request 212 from CSI 208. Thread 212*a* can create an operation object 212*b* that models a volume creation operation that would normally be performed directly to service volume creation request 212. Upon creating operation object 212*b*, thread 212*a* can identify waiting buffer 204*a* and place operation object 212*b* to waiting buffer 204*a* since waiting buffer 204*a* is a waiting buffer for requests for volumes on storage array 206*a*. Thread 212*a* can then determine that operation object 212*b* is not the first operation object in waiting buffer 204*a*. As a result, thread 212*a* does not notify thread 220*a*. That is, thread 212*a* does not notify thread 220*a* since thread 220*a* has already been notified of operation object(s) waiting in waiting buffer 204*a* by the first thread 210*a*. Thread 212*a* can then wait to receive the result of the volume creation request (e.g., result of volume creation request 212).

In some embodiments, upon expiration of the predetermined buffer waiting period defined for waiting buffer 204*a*, thread 220*a* can retrieve operation objects 210*b*, 212*b* from waiting buffer 204*a*. Operation objects 210*b*, 212*b* represent volume creation requests 210, 212, respectively, which are waiting to be processed in waiting buffer 204*a*. Thread 220*a* can then combine operation objects 210*b*, 212*b* into a single workload composed of a volume creation request to storage array 206*a* for the number of volumes being requested by operation objects 210*b*, 212*b*. Thread 220*a* can then execute the single workload and update operation objects 210*b*, 212*b* with the result of the execution. For example, if the requested number of volumes is successfully created on storage array 206*a*, thread 220*a* can update operation objects 210*b*, 212*b* to indicate that the number of volumes requested by each operation object 210*b*, 212*b* has been successfully created. Otherwise, if the requested number of volumes is not successfully created on storage array 206*a*, thread 220*a* can update operation objects 210*b*, 212*b* to indicate that the number of volumes requested by each operation object 210*b*, 212*b* has not been successfully created. Upon updating operation objects 210*b*, 212*b* with the result of the execution, thread 220*a* can notify threads 210*a*, 212*a* associated with operation objects 210*b*, 212*b*, respectively, of the completion of the respective volume creation requests 210, 212. In response, threads 210*a*, 212*a* can communicate the result of volume creation requests 210, 212 to the respective clients that issued volume creation requests 210, 212.

Still referring to the example of FIG. 2, management system 202 may receive a volume creation request 214 from CSI 208. For example, volume creation request 214 may be a request to create a volume(s) on storage array 206b. In response, management system 202 can generate a thread 214a to accept and process volume creation request 214 from CSI 208. Thread 214a can create an operation object 214b that models a volume creation operation that would normally be performed directly to service volume creation request 214. Upon creating operation object 214b, thread 214a can identify waiting buffer 204b and place operation object 214b to waiting buffer 204b since waiting buffer 204b is a waiting buffer for requests for volumes on storage array 206b. Thread 214a can then determine whether operation object 214b placed in waiting buffer 204b is a first operation object in waiting buffer 204b. In the example of FIG. 2, thread 214a can notify a thread 220b that is waiting on waiting buffer 204b of operation object 214b waiting to be processed in waiting buffer 204b since operation object 214b is a first operation object in waiting buffer 204b. Thread 214a can then wait to receive the result of the volume creation request (e.g., result of volume creation request 214).

Management system 202 may subsequently receive a volume creation request 216 from CSI 208. For example, volume creation request 216 may be a request to create a volume(s) on storage array 206b. Volume creation request 216 may be received within the duration of a predetermined buffer waiting period defined for waiting buffer 204b (i.e., received prior to expiration of the predetermined buffer waiting period defined for waiting buffer 204b). In response, management system 202 can generate a thread 216a to accept and process volume creation request 216 from CSI 208. Thread 216a can create an operation object 216b that models a volume creation operation that would normally be performed directly to service volume creation request 216. Upon creating operation object 216b, thread 216a can identify waiting buffer 204b and place operation object 216b to waiting buffer 204b since waiting buffer 204b is a waiting buffer for requests for volumes on storage array 206b. Thread 216a can then determine that operation object 216b is not the first operation object in waiting buffer 204b. As a result, thread 216a does not notify thread 220b. That is, thread 216a does not notify thread 220b since thread 220b has already been notified of operation object(s) waiting in waiting buffer 204b by the first thread 214a. Thread 216a can then wait to receive the result of the volume creation request (e.g., result of volume creation request 216).

With continued reference to the example of FIG. 2, management system 202 may subsequently receive a volume creation request 218 from CSI 208. For example, volume creation request 218 may be a request to create a volume(s) on storage array 206b. Volume creation request 218 may be received within the duration of the predetermined buffer waiting period defined for waiting buffer 204b (i.e., received prior to expiration of the predetermined buffer waiting period defined for waiting buffer 204b). In response, management system 202 can generate a thread 218a to accept and process volume creation request 218 from CSI 208. Thread 218a can create an operation object 218b that models a volume creation operation that would normally be performed directly to service volume creation request 218. Upon creating operation object 218b, thread 218a can identify waiting buffer 204b and place operation object 218b to waiting buffer 204b since waiting buffer 204b is a waiting buffer for requests for volumes on storage array 206b. Thread 218a can then determine that operation object 218b is not the first operation object in waiting buffer 204b. As a result, thread 218a does not notify thread 220b. That is, thread 218a does not notify thread 220b since thread 220b has already been notified of operation object(s) waiting in waiting buffer 204b by the first thread 214a. Thread 218a can then wait to receive the result of the volume creation request (e.g., result of volume creation request 218).

Upon expiration of the predetermined buffer waiting period defined for waiting buffer 204b, thread 220b can retrieve operation objects 214b, 216b 218b from waiting buffer 204b. Operation objects 214b, 216b 218b represent volume creation requests 214, 216, 218, respectively, which are waiting to be processed in waiting buffer 204b. Thread 220b can then combine operation objects 214b, 216b, 218b into a single workload composed of a volume creation request to storage array 206b for the number of volumes being requested by operation objects 214b, 216b. 218b. Thread 220b can then execute the single workload and update operation objects 214b, 216b, 218b with the result of the execution. For example, if the requested number of volumes is successfully created on storage array 206b, thread 220b can update operation objects 214b, 216b, 218b to indicate that the number of volumes requested by each operation object 214b, 216b, 218b has been successfully created. Otherwise, if the requested number of volumes is not successfully created on storage array 206b, thread 220b can update operation objects 214b, 216b, 218b to indicate that the number of volumes requested by each operation object 214b, 216b, 218b has not been successfully created. Upon updating operation objects 214b, 216b, 218b with the result of the execution, thread 220b can notify threads 214a, 216a, 218a associated with operation objects 214b, 216b, 218b, respectively, of the completion of the respective volume creation requests 214, 216, 218. In response, threads 214a, 216a, 218a can communicate the result of volume creation requests 214, 216, 218 to the respective clients that issued volume creation requests 214, 216, 218.

FIG. 3 shows an example operation object 300, in accordance with an embodiment of the present disclosure. As mentioned previously, operation object 300 can model a volume creation operation that would normally be performed directly to service a volume creation request. In this regard, operation object 300 can be understood as representing a request for a volume(s) on a storage device. As shown, illustrative operation object 300 can include the following attributes: a numVolumes, a volumeSize, a volumeSizeUnit, a volumeConfigType, a StorageGroup, an output, an exception, a finished flag, and a too busy flag. The values for the attributes numVolumes, volumeSize, volumeSizeUnit, volumeConfigType, and storageGroup may be determined from the volume creation request (i.e., the values for these attributes may be provided with the volume creation request). The list of attributes shown in operation object 300 is merely illustrative and is not intended to depict a complete list of attributes which can be included in an operation object.

The numVolumes attribute can indicate a number of volumes that is being requested by the volume creation request. The volumeSize attribute can indicate a size of each volume that is being requested. The volumeSizeUnit attribute can indicate a unit of the volume size (e.g., "MB" to designate megabyte, "Cyl" to designate cylinder size, e.g., 1.75 MB, among others) indicated by the volumeSize attribute. The volumeConfigType attribute can indicate a type of storage device/RAID that is being requested. The storageGroup attribute is a virtual concept of a storage object. For example, the storageGroup attribute can indicate a grouping of LUNs. The output attribute can indicate a result of the volume creation request. For example, the output attribute can indicate a return code (e.g., success, fail, etc.) provided by the storage device. The exception attribute can indicate an exception that may be generated by the storage device during processing of the volume creation request. The finished flag attribute may be a flag (e.g., finished="True" or finished="False") that indicates whether the volume creation request has completed processing. For example, a waiting buffer thread (e.g., thread 220a or thread 220b of FIG. 2) that is executing a workload which includes the volume creation request can wait for a predetermined timeout N (e.g., N=1.8 minutes, 1.9 minutes, 2 minutes, or any suitable duration) for the workload to complete. If the workload fails to complete by the timeout N, the waiting buffer thread can set the finished flag attribute to "False". The value of N may be configured as part of a management system execution policy. The too busy flag attribute may be a flag (e.g., too busy="True" or too busy="False") that indicates whether the management system (e.g., management system 202 of FIG. 2) and/or the storage device is too busy to process the volume creation request. For example, if the management system is currently too busy to process the volume creation request, the management system can set the too busy flag attribute to "True". Similarly, if the storage device on which the volume creation is being requested is currently too busy to process the volume creation request, the storage device can set the too busy flag attribute to "True".

Figure 4:
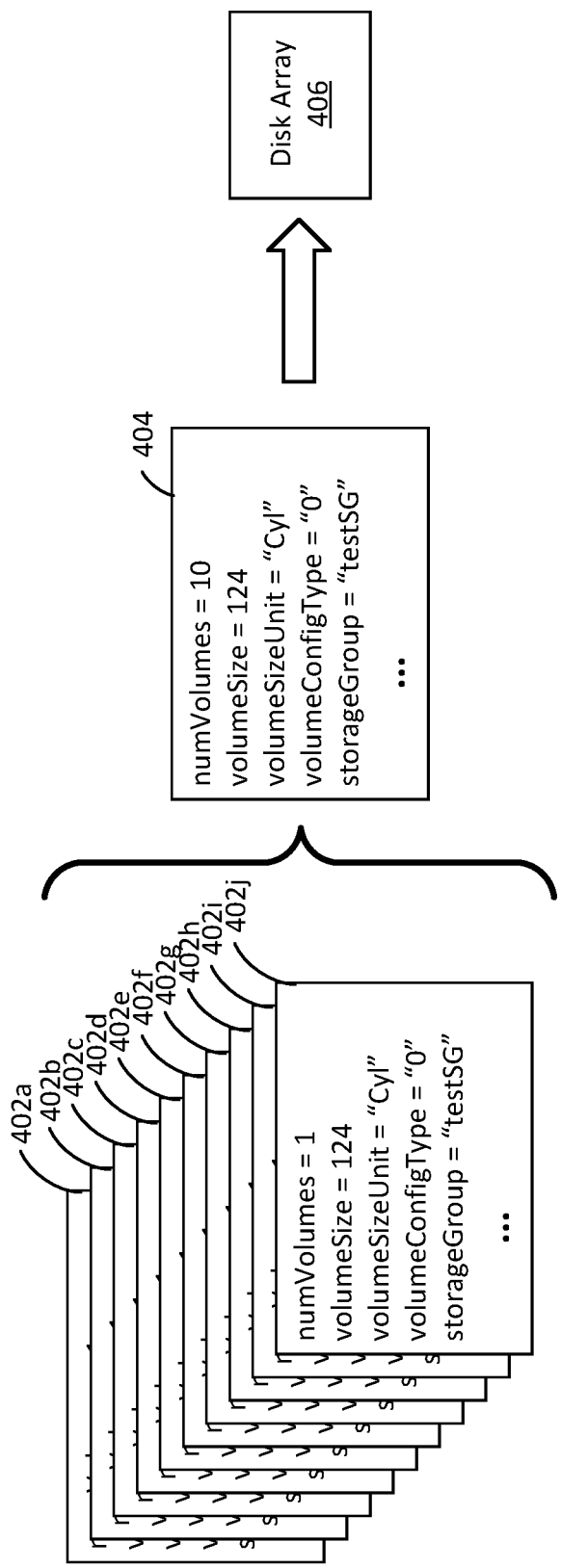
FIG. 4 is a diagram illustrating a combining of operation objects into a single workload composed of an operation object that is the combination of the operation objects, in accordance with an embodiment of the present disclosure.

FIG. 4 is a diagram illustrating a combining of operation objects into a single workload composed of an operation object that is the combination of the operation objects, in accordance with an embodiment of the present disclosure. As shown, 10 operation objects 402a-402j (402 generally) may be in a waiting buffer to be processed by a waiting buffer thread. In the example of FIG. 4, each operation object 402 may represent a volume creation request for one volume on a disk array 406, for example, as indicated by a numVolumes attribute "1" and a storageGroup attribute "testSG". At a time for the operation objects in the waiting buffer to be processed, for example, upon expiration of a predetermined buffer waiting period defined for the waiting buffer, the waiting buffer thread can create an operation object 404 which represents a combination of the 10 operation objects 402 in the waiting buffer. Operation object 404 can represent a volume creation request for 10 volumes on disk array 406, which is a total of the number of volumes being requested by the 10 operation objects 402. The waiting buffer thread can then execute a single workload composed of operation object 404, which is the combination of the 10 operation objects 402. For example, in some implementations, the waiting buffer thread can issue a single volume creation request and pass operation object 404 with the single volume creation request to disk array 406. The single volume creation request is a request to create the number of volumes indicated by operation object 404.

Figure 5:
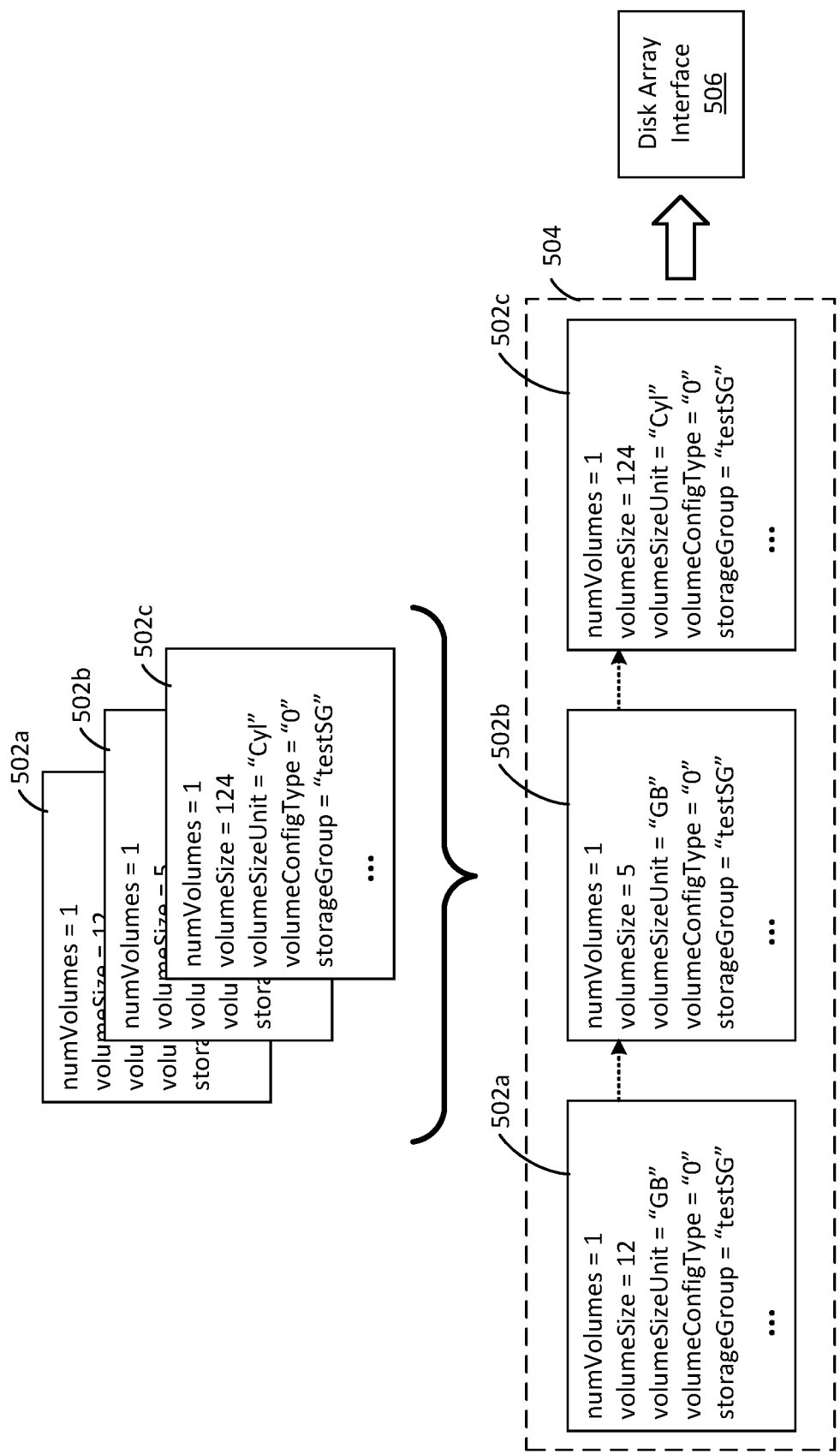
FIG. 5 is a diagram illustrating a combining of operation objects into a single workload composed of a linked list of one or more operation objects, in accordance with an embodiment of the present disclosure.

FIG. 5 is a diagram illustrating a combining of operation objects into a single workload composed of a linked list of one or more operation objects, in accordance with an embodiment of the present disclosure. As shown, three operation objects 502a-502c (502 generally) may be in a waiting buffer to be processed by a waiting buffer thread. In the example of FIG. 5, one or more of the operation objects 502 may represent a volume creation request for a different number of volumes of a different volume size and volume size unit on a disk array 506. For example, operation object 502a may represent a volume creation request for one volume of size 124 Cyl on disk array 506 as indicated by a volumeSize attribute "124", a volumeSizeUnit attribute "Cyl", and a storageGroup attribute "testSG". Operation object 502b may represent a volume creation request for one volume of size 5 GB on disk array 506 as indicated by a volumeSize attribute "5", a volumeSizeUnit attribute "GB", and a storageGroup attribute "testSG", and operation object 502c may represent a volume creation request for one volume of size 12 GB on disk array 506 as indicated by a volumeSize attribute "12", a volumeSizeUnit attribute "GB", and a storageGroup attribute "testSG". At a time for the operation objects in the waiting buffer to be processed, for example, upon expiration of a predetermined buffer waiting period defined for the waiting buffer, the waiting buffer thread can create an operation object 504 which represents a combination of the three operation objects 502 in the waiting buffer. In particular, operation object 504 can be a linked list of the three operation objects 502a-502c. The waiting buffer thread can then execute a single workload composed of operation object 504, which is the combination of the three operation objects 502a-502c in the form of a linked list. For example, in some implementations, the waiting buffer thread can issue a single volume creation request and pass operation object 504 with the single volume creation request to disk array 506. The single volume creation request is a request to create the number of volumes indicated by the linked list of operation objects 502a-502c in operation object 504.

Figure 6:
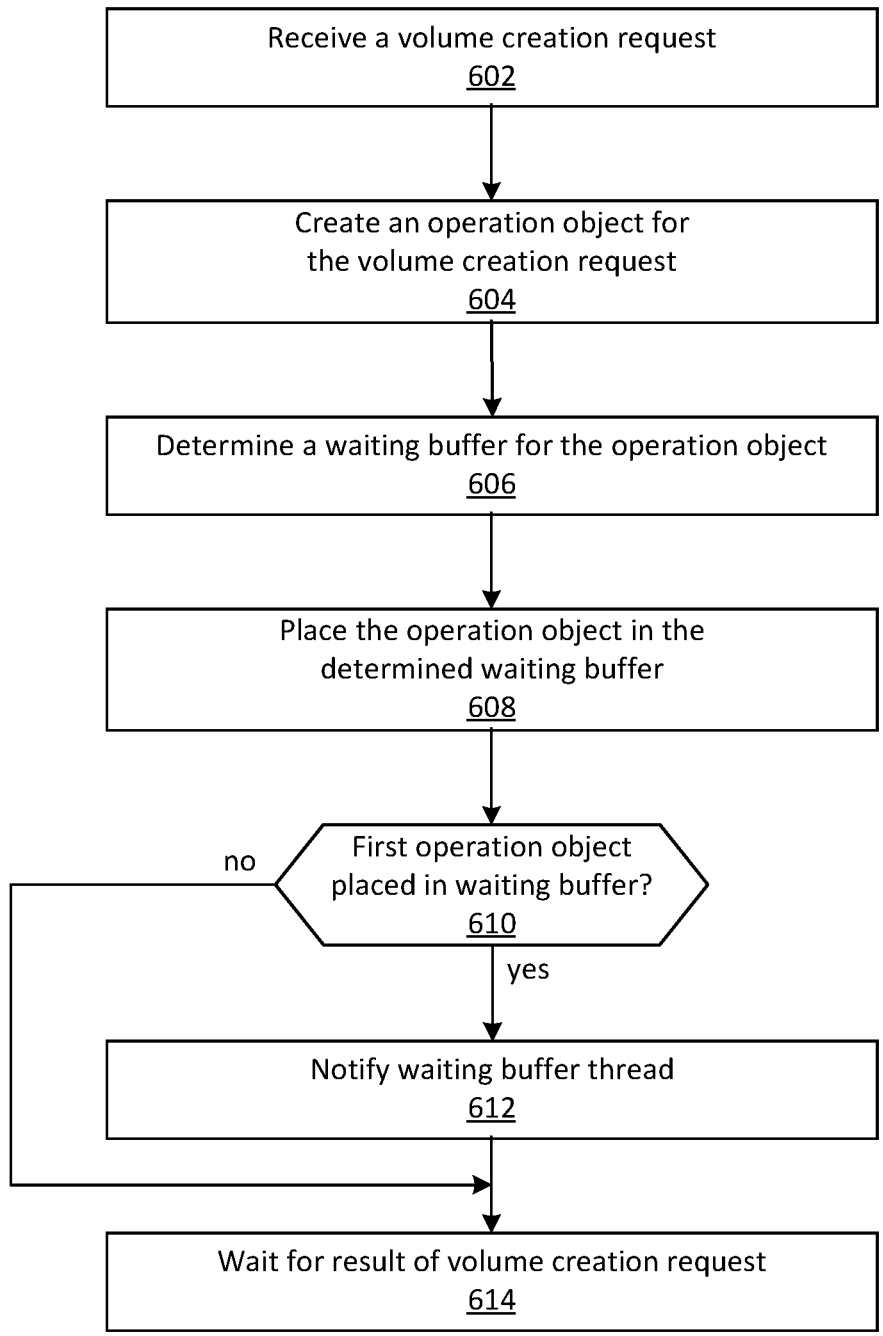
FIG. 6 is a flow diagram of an example process for processing incoming volume creation requests, in accordance with an embodiment of the present disclosure.

FIG. 6 is a flow diagram of an example process 600 for processing incoming volume creation requests, in accordance with an embodiment of the present disclosure. Illustrative process 600 may be implemented, for example, within storage system 100 of FIG. 1 and/or management system 202 of FIG. 2.

With reference to process 600 of FIG. 6, at 602, a volume creation request may be received. For purposes of this discussion, the volume creation request may be received by a management system (e.g., management system 202 of FIG. 2) within a storage system (e.g., storage system 100 of FIG. 1). Also, the volume creation request may be from an orchestration tool (e.g., CSI 208 of FIG. 2) within the storage system and may be a request to create a volume(s) on a storage device. For example, the management system can receive the volume creation request.

At 604, an operation object for the volume creation request may be created. For example, a thread generated by the management system to process the volume creation request can create an operation object that models a volume creation operation that would be performed to service the volume creation request. In this regard, the operation object is based on the volume creation request and models the creation of the number of volumes specified by the volume creation request on the storage device.

At 606, a waiting buffer for the operation object may be determined. For example, the thread generated to process the volume creation request can determine an appropriate waiting buffer for the operation object. In some embodiments, an appropriate waiting buffer for the operation object may be determined based on a storage group indicated in or associated with the volume creation request. In other embodiments, an appropriate waiting buffer for the operation object may be determined based on characteristics of an API call used to make the volume creation request.

At 608, the operation object may be placed in the determined waiting buffer. For example, the thread generated to process the volume creation request can place the operation object in the waiting buffer determined at 606.

At 610, a check to determine whether the operation object placed in the waiting buffer is a first operation object placed in the waiting buffer may be performed. If it is determined that the operation object operation object placed in the waiting buffer is a first operation object placed in the waiting buffer, then, at 612, a waiting buffer thread that is waiting on the waiting buffer may be notified. For example, the thread generated to process the volume creation request can notify the waiting buffer thread that there is an operation object waiting to be processed in the waiting buffer thread.

Otherwise, if, at 610, it is determined that the operation object operation object placed in the waiting buffer is not a first operation object placed in the waiting buffer or subsequent to notifying the waiting buffer thread at 612, at 614, the thread associated with the operation object may wait for the result of the volume creation request. For example, the thread generated to process the volume creation request can wait for the result of the volume creation request.

Figure 7:
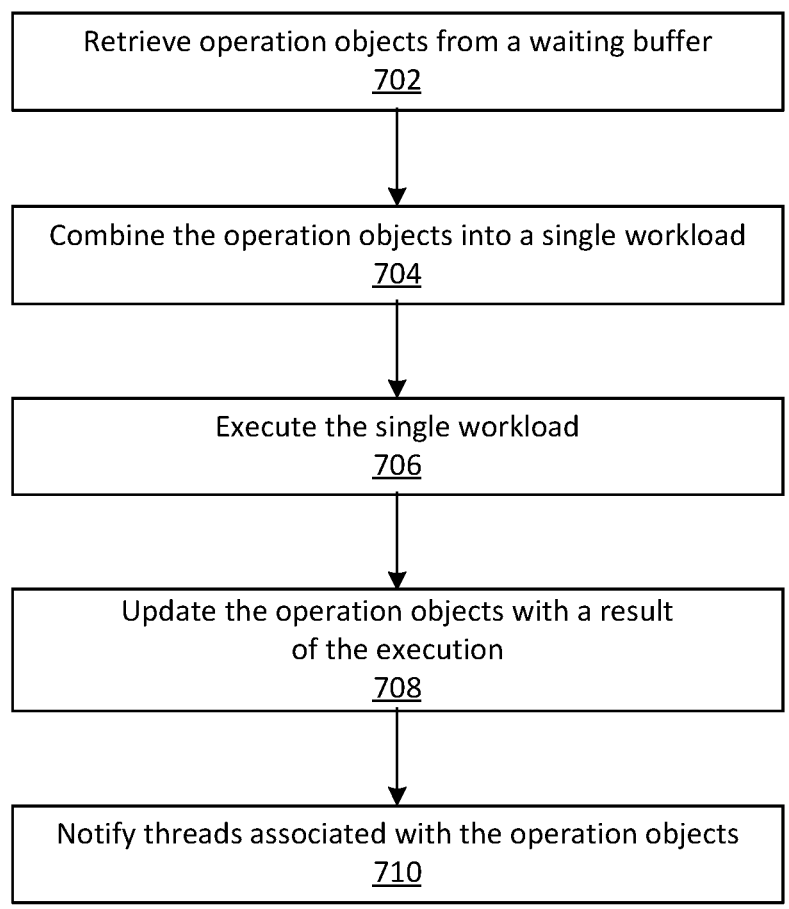
FIG. 7 is a flow diagram of an example process for processing operation objects in a waiting buffer, in accordance with an embodiment of the present disclosure.

FIG. 7 is a flow diagram of an example process 700 for processing operation objects in a waiting buffer, in accordance with an embodiment of the present disclosure. Illustrative process 700 may be implemented, for example, within storage system 100 of FIG. 1 and/or management system 202 of FIG. 2.

With reference to process 700 of FIG. 7, at 702, operation objects may be retrieved from a waiting buffer. For purposes of this discussion, the operation objects in the waiting buffer may represent volume creation requests for creating volumes on a storage device, and the operation objects may have been placed in the waiting buffer by respective threads generated by a management system (e.g., management system 202 of FIG. 2) to process the volume creation requests. Also, a waiting buffer thread which is waiting on the waiting buffer may retrieve the operation objects from the waiting buffer upon expiration of a predetermined buffer waiting period defined for the waiting buffer. For example, the waiting buffer thread can retrieve the operation objects from the waiting buffer.

At 704, the retrieved operation objects may be combined into a single workload. For example, the waiting buffer thread can combine the operation objects retrieved at 702 into a single workload composed of an operation object which is a combination of the retrieved operation objects.

At 706, the single workload may be executed. For example, the waiting buffer thread can execute the single workload composed of the operation object which is a combination of the retrieved operation objects. For example, the waiting buffer thread can issue a single volume creation request to the disk array and pass the operation object which is a combination of the retrieved operation objects with the single volume creation request. The operation object passed with the single volume creation request to the disk array enables the disk array to determine the number and type of volumes that are being requested.

At 708, the operation objects may be updated with a result of the execution of the workload. For example, the waiting buffer thread can update each of the operation objects combined at 704 with the result of the execution of the workload.

At 710, the threads associated with the operation objects may be notified. For example, the waiting buffer thread can notify the threads associated with the operation objects of the completion of the respective volume creation requests (e.g., notify the respective threads generated by the management system to process the volume creation requests). The threads associated with the operation objects can then communicate the result of the volume creation requests to the respective clients that requested the volumes on the storage device.

FIG. 8 is a block diagram illustrating selective components of an example computing device 800 in which various aspects of the disclosure may be implemented, in accordance with an embodiment of the present disclosure. For example, illustrative computing device 800 can perform all or part of the processes described herein. As shown, computing device 800 includes one or more processors 802, a volatile memory 804 (e.g., random access memory (RAM)), a non-volatile memory 806, a user interface (UI) 808, one or more communications interfaces 810, and a communications bus 812.

Non-volatile memory 806 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 808 may include a graphical user interface (GUI) 814 (e.g., a touchscreen, a display, etc.) and one or more input/output (I/O) devices 816 (e.g., a mouse, a keyboard, a microphone, one or more speakers, one or more cameras, one or more biometric scanners, one or more environmental sensors, and one or more accelerometers, etc.).

Non-volatile memory 806 stores an operating system 818, one or more applications 820, and data 822 such that, for example, computer instructions of operating system 818 and/or applications 820 are executed by processor(s) 802 out of volatile memory 804. In one example, computer instructions of operating system 818 and/or applications 820 are executed by processor(s) 802 out of volatile memory 804 to perform all or part of the processes described herein (e.g., processes illustrated and described with reference to FIGS. 1 through 7). In some embodiments, volatile memory 804 may include one or more types of RAM and/or a cache memory that may offer a faster response time than a main memory. Data may be entered using an input device of GUI 814 or received from I/O device(s) 816. Various elements of computing device 800 may communicate via communications bus 812.

The illustrated computing device 800 is shown merely as an illustrative client device or server and may be implemented by any computing or processing environment with any type of machine or set of machines that may have suitable hardware and/or software capable of operating as described herein.

Processor(s) 802 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 802 may be analog, digital, or mixed signal. In some embodiments, processor 802 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 810 may include one or more interfaces to enable computing device 800 to access a computer network such as a Local Area Network (LAN), a Wide Area Network (WAN), a Personal Area Network (PAN), or the Internet through a variety of wired and/or wireless connections, including cellular connections.

In described embodiments, computing device 800 may execute an application on behalf of a user of a client device. For example, computing device 800 may execute one or more virtual machines managed by a hypervisor. Each virtual machine may provide an execution session within which applications execute on behalf of a user or a client device, such as a hosted desktop session. Computing device 800 may also execute a terminal services session to provide a hosted desktop environment. Computing device 800 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
responsive to receiving, by a computing device, a plurality of creation requests to create one or more volumes on a storage device:
creating, by the computing device, operation objects for each of the plurality of creation requests, wherein each operation object models a volume creation request operation representing a request a request for a volume, each operation object comprising attributes including at least one status of a volume;

determining, by the computing device, that a waiting buffer is appropriate for one or more of the operation objects;

placing, by the computing device, the one or more operation objects in the waiting buffer;

responsive to a determination that a first operation object is a first operation object placed in the waiting buffer, notifying, by the computing device, a waiting buffer thread of the first operation object in the waiting buffer;

creating a combination operation object including two or more operation objects in the waiting buffer; and executing a workload comprising the combination operation object.

2. The method of claim 1, wherein the appropriate waiting buffer is determined based on a storage group associated with the plurality of volume creation requests.

3. The method of claim 1, wherein the appropriate waiting buffer is determined based on an application programming interface (API) call used to make the plurality of volume creation requests.

4. The method of claim 1, further comprising:
responsive to a determination that a second operation object is not the first operation object placed in the waiting buffer, not notifying, by the computing device, the waiting buffer thread of the second operation object in the waiting buffer.

5. The method of claim 1, wherein the combination operation object includes a linked list of the two or more operation objects.

6. The method of claim 1, wherein the computing device is included within a storage system.

7. The method of claim 1, wherein the plurality of volume creation requests are from an orchestration tool associated with a storage system.

8. The method of claim 1, wherein the attributes include a volume size, a size unit, a configuration type, and a storage group and the status includes an output, an exception, a finished flag, and a too busy flag.

9. The method of claim 1, further comprising updating the status of the two or more operation objects based on the execution of the workload.

10. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
responsive to receiving a plurality of creation requests to create one or more volumes on a storage device:
creating operation objects for each of the plurality of creation requests, wherein each operation object models a volume creation request operation representing a request a request for a volume, each operation object comprising attributes including at least one status of a volume;
determining that a waiting buffer is appropriate for one or more of the operation objects;
placing the one or more operation objects in the waiting buffer;
responsive to a determination that a first operation object is a first operation object placed in the waiting buffer, notifying, by the computing device, a waiting buffer thread of the first operation object in the waiting buffer;
creating a combination operation object including two or more operation objects in the waiting buffer; and
executing a workload comprising the combination operation object.

11. The system of claim 10, wherein the appropriate waiting buffer is determined based on a storage group associated with the plurality of volume creation requests.

12. The system of claim 10, wherein the appropriate waiting buffer is determined based on an application programming interface (API) call used to make the plurality of volume creation requests.

13. The system of claim 10, wherein the process further comprises:
responsive to a determination that a second operation object is not the first operation object placed in the waiting buffer, not notifying, by the computing device, the waiting buffer thread of the second operation object in the waiting buffer.

14. The system of claim 10, wherein the combination operation object includes a linked list of the two or more operation objects.

15. A non-transitory machine-readable medium encoding instructions that when executed by one or more processors cause a process to be carried out, the process including:
responsive to receiving a plurality of creation requests to create one or more volumes on a storage device:
creating operation objects for each of the plurality of creation requests, wherein each operation object models a volume creation request operation representing a request a request for a volume, each operation object comprising attributes including at least one status of a volume;
determining that a waiting buffer is appropriate for one or more of the operation objects;
placing the one or more operation objects in the waiting buffer;
responsive to a determination that a first operation object is a first operation object placed in the waiting buffer, notifying, by the computing device, a waiting buffer thread of the first operation object in the waiting buffer;
creating a combination operation object including two or more operation objects in the waiting buffer; and
executing a workload comprising the combination operation object.

16. The machine-readable medium of claim 15, wherein the process further comprises:
responsive to a determination that a second operation object is not the first operation object placed in the waiting buffer, not notifying, by the computing device, the waiting buffer thread of the second operation object in the waiting buffer.

17. The machine-readable medium of claim 15, wherein the combination operation object includes a linked list of the two or more operation objects.

18. The method of claim 1, wherein the workload comprises a single volume creation request based on the combination operation object.

* * * * *